Oct. 21, 1969 S. L. BREMER 3,473,833
PLASTIC PIPE COUPLING
Filed Dec. 28, 1967 2 Sheets-Sheet 1
FIG. 1
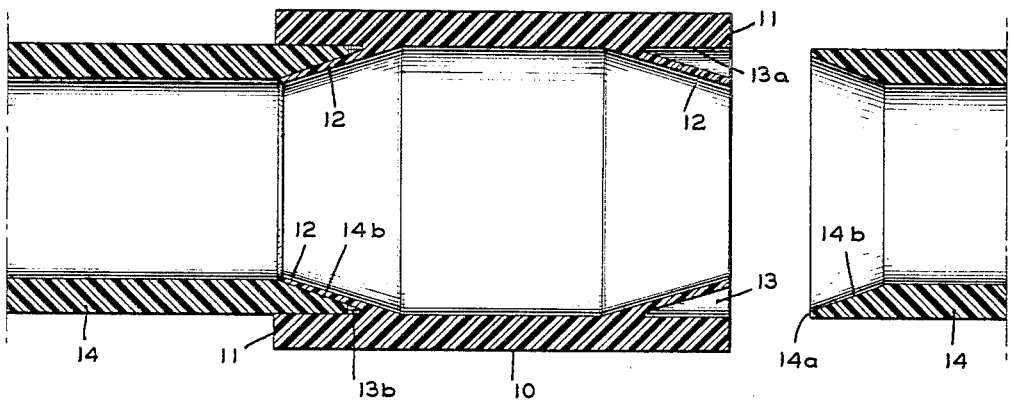
FIG. 2
FIG. 3
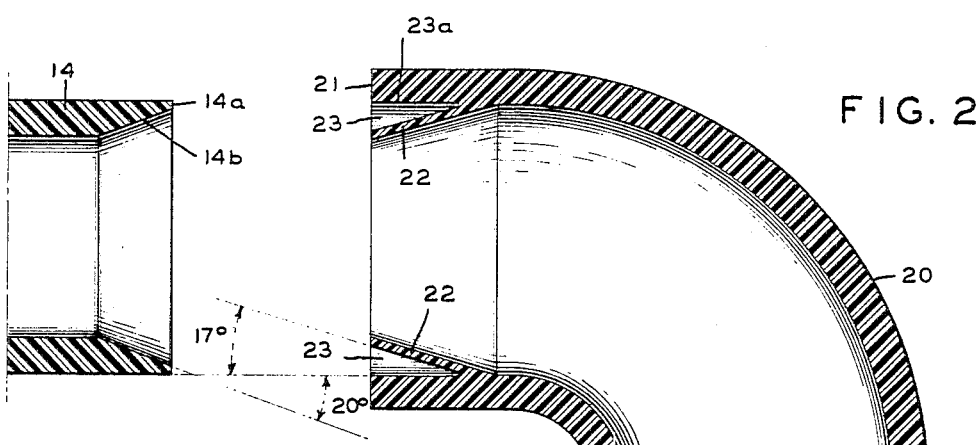
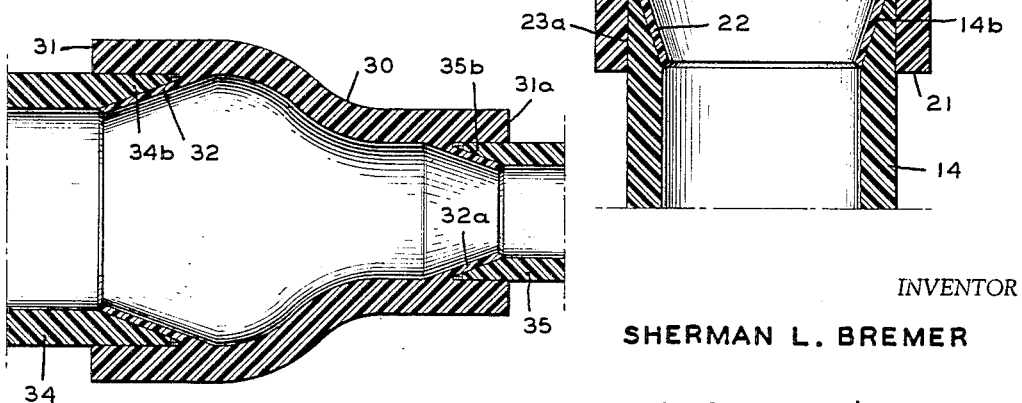
INVENTOR
SHERMAN L. BREMER
BY Allen A. Meyer Jr.
ATTORNEY INVENTOR
SHERMAN L. BREMER
BY *Allen A. Meyer, Jr.*
ATTORNEY

3,473,833
PLASTIC PIPE COUPLING
Sherman L. Bremer, Champaign, Ill., assignor to National Distillers and Chemical Corporation, New York, N.Y., a corporation of Virginia
Filed Dec. 28, 1967, Ser. No. 694,125
Int. Cl. F16l *13/00*
U.S. Cl. 285—284                            2 Claims

ABSTRACT OF THE DISCLOSURE

A tubular coupling for connecting adjacent lengths of plastic pipe or tubing, each extremity of the coupling including an internal and angularly inclined annular lip providing an outwardly facing V-shaped peripheral recess or groove within which the complementarily conformed extremity of a pipe length is received. A coating of an adhesive may be applied between the wedge-shaped extremity of the pipe and the walls of the V-shaped recess to prevent inadvertent loosening or separation.

---

This invention relates to a novel coupling or connector for joining adjacent lengths of plastic pipe or tubing without requiring any threading of the coupling or pipes. The invention is equally applicable for attaching plastic pipe or tubing to reducers, T's, elbows, or other formed attachments or fixtures.

Any type of rigid, semi-rigid, or flexible plastic pipe or tubing may be employed with equal facility. The pipe or tubing may be produced from any suitable plastic or thermoplastic material such as polyvinylchloride, polyethylene, polypropylene, other olefins, and the like.

Neither special tools nor skilled labor is required for readily effecting fluid-proof joints between the novel coupling of the present invention and pipe extremities, and at the point of union neither the pipe nor the connector is in any way weakened, nor is there any impairment of fluid flow therethrough. In fact, at the area of union or connection, both coupling and pipe are strengthened above the normal values of the individual components.

With the avoidance of any necessity for threaded connections, or for the use of heat or flame to produce soldered or welded connections, piping assemblies, such as required in connection with plumbing systems, or the like, may be installed with particular economy and ease without any necessity for the costly and time consuming operations essential in systems where threaded and soldered joints are required or where the installation is produced from conventional materials such as galvanized piping, black iron piping, brass tubing, and the like.

Further objects and advantages of the invention will be readily apparent from the following description, taken in conjunction with the accompanying drawings, wherein:

FIGURE 1 is a longitudinal sectional view through a novel coupling produced in accordance with the present invention and illustrating the extremity of one pipe section united thereto and the extremity of the adjacent pipe section in position to be connected thereto;

FIGURE 2 is a longitudinal sectional view through an elbow constructed in accordance with the present invention and illustrating the extremity of one pipe length united thereto and the extremity of the adjacent pipe length or section in position to be connected thereto;

FIGURE 3 is a longitudinal sectional view through a reducer constructed in accordance with the present invention and illustrating adjacent lengths of pipe of different diameters connected thereto.

Figure 4:
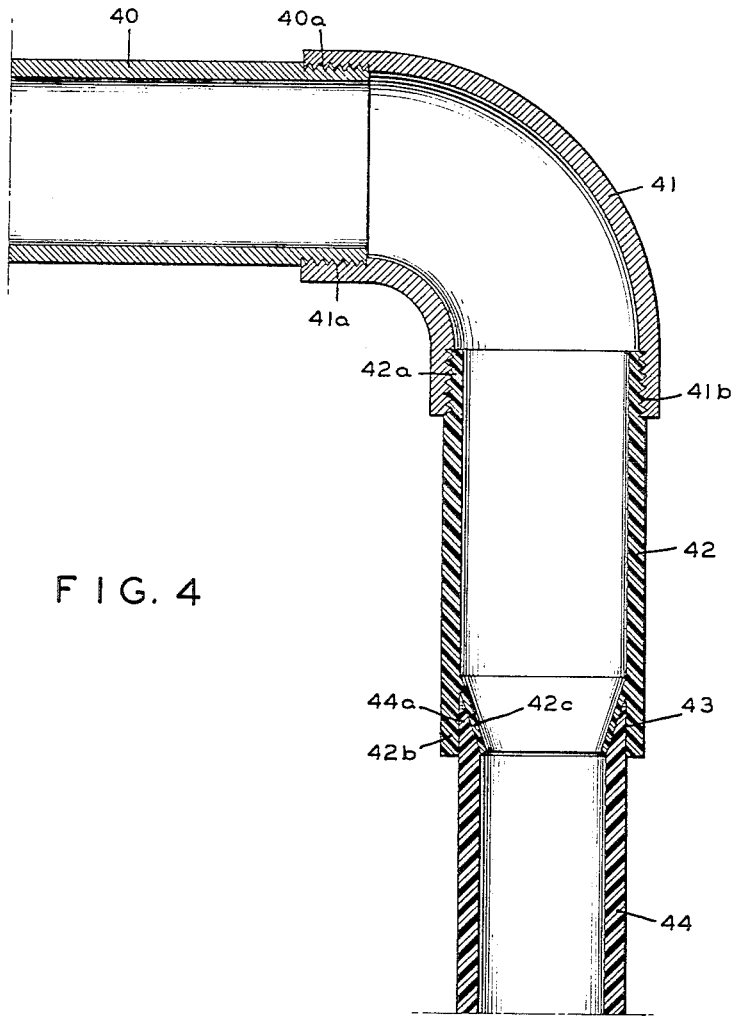
FIGURE 4 is a longitudinal sectional view through a slightly modified form of the invention illustrating an adaption thereof for connecting a plastic pipe to a metallic pipe and metallic elbow.

As shown in the drawings, particular reference being had to FIGURE 1, the coupling is constituted by a tubular sleeve 10 produced from any suitable plastic material such as polyvinylchloride, polyethylene, polypropylene, or the like, by any suitable molding process, it being understood that the sleeve may be injection molded, roto-molded or cast molded with equal facility. Adjacent each extremity 11 of the sleeve 10 an internal inclined lip 12 is provided; desirably, these lips are formed integrally with the sleeve and provide outwardly facing annular V-shaped grooves or recesses 13.

The outer wall 13a of each of these recesses is parallel with the peripheral surface of the sleeve and the angular relationship between the inwardly inclined wall of the annular recess 13 and the wall 13a is on an angle on the order of 17° for a purpose to be discussed more fully hereafter.

Each plastic pipe or tube 14 which is to be connected to the coupling or union 10 is provided with a squared edge surface or extremity 14a, and a tapered wedge surface 14b extends inwardly therefrom, the length of this wedge surface being slightly less than the depth of the mating recess 12.

It will be understood that the wall thicknesses and diameters of both the coupling 10 and the pipe or tube 14 may vary as desired in accordance with strength characteristics and interior diameters required. Furthermore, non-uniformity of inside diameter (and hence wall thickness) of the pipe, a common situation in extended plastic pipe, presents no difficulties in the function of the present invention. It is essential however that the exterior diameter of the pipe be complementary with the exterior diameter of the recess 13 to insure the snug reception therein of the pipe extremity.

The angular relationship of the wedge surface to the plane of the exterior surface of the pipe section also is critical and this should be on the order of 20°.

Assembly of pipe sections and coupling is particularly simple, as is illustrated in the left hand portion of FIGURE 1 of the drawings, where the extremity of a section 14 is shown as inserted within the recess 13 to the limit of the wedge surface 14b. The 20° angular relationship of the wedge surface cooperating with the 17° angular disposition of the mating lip 12 spreads the recess 13, by reason of the inherent resiliency of the plastic material, to provide a tight fit and insure a fluid-proof joint. It is contemplated that a suitable adhesive material may be applied to the extremity of the exterior surface of the pipe section 14 and/or to the interior of the mating recess 13, care being exercised to select an adhesive which is compatible with the plastic materials employed in the production of both coupling and pipe, and any surplus adhesive material will be received at the base of the recess 13 in the small space 13b resulting from the squaring off of the pipe extremity.

The three degree (3°) interference angle will permit the coupling to fit snugly about the pipe or tube extremity and, it has been found in practice, will compensate fully for any variance in wall thicknesses which may arise in connection with extruded pipes or tubing.

FIGURE 1 of the drawings illustrates a coupling intended for the joining of adjacent lengths of pipe or tubing in end-to-end relationship.

The embodiment of the invention disclosed in FIGURE 2 illustrates a fitting or elbow 20 intended for the connecting of two lengths of pipe or tubing disposed at an angular relationship of 90°. Adjacent each extremity 21 of the fitting 20, an internal annular inclined lip 22 is provided and these lips, which are substantially identical to the lips 12 described hereabove, provide outwardly facing annular V-shaped grooves or recesses 23.

The outer wall 23a of each of these recesses 23 disposed on a plane parallel to that of the adjacent peripheral surface of the fitting 20 and the angular relationship between the top and bottom walls of each recess is on the order of 17° for the reasons pointed out hereabove.

Thus, except for the configuration thereof, the fitting 20 is structurally identical to the coupling 10 illustrated in FIGURE 1 and the connection therewith of the extremities of pipe or tube sections is identically as described and it is believed that no further discussion is required. It will be understood that other varieties of fittings may be produced in accordance with the present invention, including T's, Y-shaped fittings, and the like, and it is not believed that either illustration thereof or detailed description is necessary.

A reducer 30 has been illustrated in FIGURE 3 of the drawings intended for use where two pipes or tubes of different diameters are to be connected. As shown, the larger extremity 31 of the reducer is provided with an internal inclined annular lip 32, located on an angle of 17°, providing a recess for the reception of the wedge shaped (20° angle) extremity 34b of the pipe or tube 34. A similar internal lip 32a is provided adjacent the smaller extremity 31a of the reducer, and the wedge shaped extremity 35b of the pipe or tube 35 is received therein.

The embodiment of the invention illustrated in FIGURE 4 of the drawings discloses the utilization of a novel coupling produced in accordance with the present invention for producing a fluid proof union or joint between metallic and plastic pipes and tubes.

As shown, the metallic pipe 40 is provided with an externally threaded portion 40a for engagement with the internally threaded opening 41a in a metallic fitting or coupling 41 of any desired configuration, an elbow being illustrated as exemplary. The opposed opening of the fitting 41 is internally threaded as at 41b and the complementarily and externally threaded extremity 42a of a coupling 42 in accordance with the present invention is engaged therewith.

The opposed extremity 42b of the coupling 42 is provided with an internal inclined annular lip 42c, similar to the lip 12 described hereabove and providing an outwardly facing V-shaped recess 43 for the reception of the wedge shaped extremity 44a of the plastic pipe or tube 44. It will be understood that the angular relationship between the walls of the recess 43 is on the order of 17° and that the wedge angle of the plastic pipe extremity is on the order of 20° thereby providing a three-degree interference angle insuring a snug fit between the coupling or connector 42 and the pipe 44 with a fluid proof joint and no impairment of flow therethrough.

In the practice of the invention, in each embodiment illustrated, it is essential that the external diameter of each pipe section closely approximate and be no greater than the minimum internal diameter of the associated V-shaped recess to provide a snug sliding fit therein.

It will be understood that various changes may be made in the invention without departing from the spirit and scope thereof and the invention is not considered limited by that which is shown in the drawings and described in the specification.

What is claimed is:

1. In combination, a plastic pipe coupling comprising a tubular member open at both ends, each extremity thereof including an internal inwardly inclined lip providing an outwardly facing annular V-shaped recess, the outer wall of said recess being parallel to the opposed peripheral surface of said tubular member, the angular relationship between the walls of said V-shaped recess being on the order of 17°, a plastic pipe section connected to each open extremity of said tubular member, the external diameter of each pipe section being substantially identical to and no greater than the minimum internal diameter of the associated V-shaped recess to provide a snug sliding fit therein, each of said plastic pipe sections having a squared extremity and a tapered wedge surface extending inwardly therefrom, said wedge surface being of slightly lesser length than the depth of the associated V-shaped recess, and the angular relationship of said wedge surface to the plane of the peripheral wall of the pipe section being on the order of 20° thereby providing a 3° interference angle and insuring a snug and fluid-proof joint between said pipe section and coupling and a coating of an adhesive compatible with the plastic materials employed between the wedge-shaped extremity of the pipe section and the walls of the V-shaped recess within which said extremity is received to create a substantially permanent union and prevent inadvertent loosening or separation.

2. In combination, a plastic pipe coupling comprising a tubular member open at both ends, at least one extremity thereof including an internal inwardly inclined annular lip providing an outwardly facing annular V-shaped recess, the outer wall of said recess being parallel to the opposed peripheral surface of said tubular member, the angular relationship between the walls of said V-shaped recess being on the order of 17°, a plastic pipe section connected to the extremity of said tubular member which includes said internal lip, the external diameter of said pipe section being substantially identical to and no greater than the minimum internal diameter of the associated V-shaped recess to provide a snug sliding fit therein, said plastic pipe section having a squared extremity and a tapered wedge surface extending inwardly therefrom, said wedge surface being of slightly lesser length than the depth of the associated V-shaped recess, the angular relationship of said wedge surface to the plane of the peripheral wall of the pipe section being on the order of 20° thereby providing a 3° interference angle and insuring a snug and fluid-proof joint between said pipe section and coupling, and a coating of an adhesive compatible with the plastic materials employed between the wedge-shaped extremity of the pipe section and the walls of the V-shaped recess within which said extremity is received to create a substantially permanent union and prevent inadvertent loosening or separation.

References Cited

UNITED STATES PATENTS

| 643,358 | 2/1900 | Konold | 285—331 X |
|---|---|---|---|
| 1,021,264 | 3/1912 | Reusher | 285—334.4 X |
| 2,498,831 | 2/1950 | Veitch | 285—423 X |
| 2,720,332 | 10/1955 | Holt. | |
| 2,735,699 | 2/1956 | Chadbourne. | |
| 3,365,216 | 1/1968 | Babylon | 285—158 |

FOREIGN PATENTS

| 1,227,043 | 2/1960 | France. |
| 1,279,424 | 11/1961 | France. |
| 852,787 | 11/1960 | Great Britain. |
| 68,391 | 10/1944 | Norway. |

THOMAS F. CALLAGHAN, Primary Examiner

U.S. Cl. X.R.

285—334.5, 423